Dec. 31, 1929.                W. B. THOMPSON                1,741,169
                                 SPRAY GUN
                             Filed Nov. 6, 1925              4 Sheets-Sheet 1

Inventor
Wayne B. Thompson
by Charles W. McDermott
his attorney

Dec. 31, 1929.   W. B. THOMPSON   1,741,169
SPRAY GUN
Filed Nov. 6, 1925   4 Sheets-Sheet 2

Inventor
Wayne B. Thompson
by Charles W. McDermott
his attorney

Dec. 31, 1929.                W. B. THOMPSON                1,741,169
                                  SPRAY GUN
                              Filed Nov. 6, 1925           4 Sheets-Sheet 3

Inventor
Wayne B. Thompson
by Charles W. McDermott
his attorney

Patented Dec. 31, 1929

1,741,169

UNITED STATES PATENT OFFICE

WAYNE B. THOMPSON, OF WINCHESTER, MASSACHUSETTS

SPRAY-GUN

Application filed November 6, 1925. Serial No. 67,266.

The present invention relates to tools or apparatus for applying coating material, more particularly to spray guns, and more specifically to spray guns having straight-edge forming attachments.

Spray guns are usually provided with means for admitting coating material and a motive agent for discharge therefrom and also with means for supplementally discharging motive agent upon the main discharge to flatten or spread the same. In many uses of a spray gun such for instance as coating walls up to window trim, coating window trim up to the sash, coating the sash, beading motor car bodies, striping canvas, awnings and highways, it is impossible to confine the coating material within the limits of the surface it is desired to coat. Instead of obtaining a clean line of demarcation between adjacent surfaces the coating material overlaps them thus producing an unsightly appearance particularly when the adjacent surfaces are colored differently or are of different materials.

The principal objects of the present invention are to provide a spray gun with a straight-edge forming attachment by which the coating material may be confined within the surface to be coated in a reliable and positive manner and to provide a spray gun which may be operated at the will of the operative to confine one or both edges of the flattened discharge on a line or lines substantially normal to the major axis of the flattened discharge or the target formed thereby or to confine one or both faces of the flattened discharge on a line or lines substantially parallel with the major axis of the flattened discharge or the target formed thereby.

To the accomplishment of these objects, and such other as may hereinafter appear, the features of the present invention relate to certain devices, combinations and arrangements of parts, hereinafter described, and then set forth broadly and in detail in the appended claims.

The various features of the invention will be readily understood from an inspection of the accompanying drawings illustrating the best form of the invention at present known to the inventor, in which, Figure 1 is a front elevation of the spray gun having the straight-edge forming attachment in position, one arm of which is detailed in sectional elevation to show the pivotal connection between the arm and the straight-edge forming plate carried therefrom;

Figure 2:
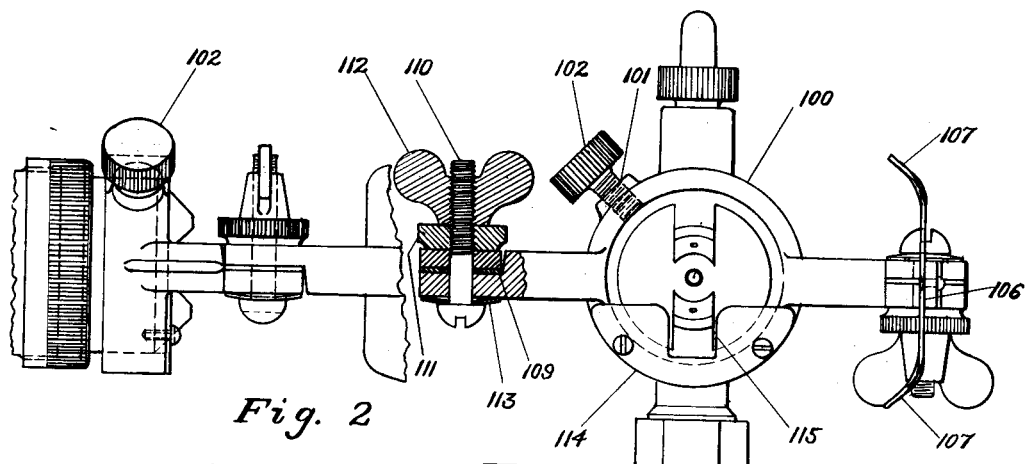
Fig. 2 is a detail in side elevation of the straight-edge forming attachment positioned on the supplemental jet delivery member, one arm and one plate (broken away) being shown.

Referring to the drawings, the apparatus or tool for applying coating material is preferably provided with a metallic body 16 (Fig. 14) which has integral therewith or suitably attached thereto a handle or extension 17. The motive agent, which may be air under pressure, is preferably introduced into the body portion 16 through the handle 17 and for that purpose I have herein shown an air passage 18 which is connected to an air hose (not shown) through an air-hose coupling 19 fitted to the lower end of the passage 18 and held in place on the handle 17 by a set screw 20. To remove particles of dirt or other foreign matter from the inflowing motive agent and prevent their entrance into the body of the tool, the coupling 19 carries a perforated conical screen 21 which extends into the passage 18.

Figures 14, 15:
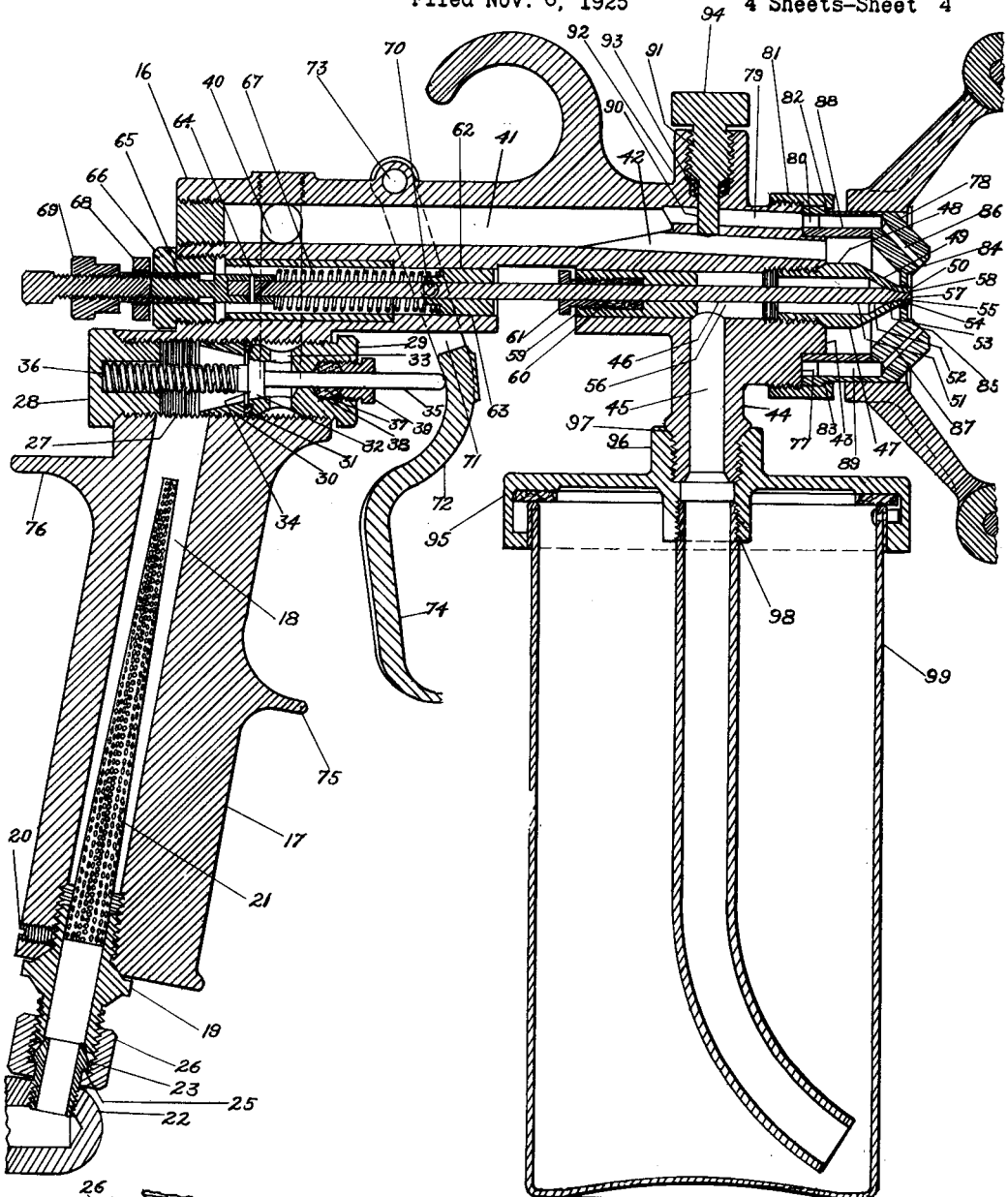
Fig. 14 is a longitudinal sectional elevation of the spray gun, the straight-edge forming attachment being broken away through the pivotal connections between the arms and the straight-edge forming plates.
Fig. 15 is a detail in elevation, partly in section, of the air hose connection supporting foot.

In periods between spraying operations the operative often desires to rest the coating material container, illustrated in Fig. 14, and the attached spray gun on a flat supporting surface. In order to prevent the heavy air hose from toppling the container over, the air-hose coupling 19 is provided with a lateral supporting foot 22 to which the air hose is connected. The foot 22 is swiveled to the coupling 19 by a thimble 23 provided with screw threads at one end to engage similar threads on the foot 22 and with a frusto-conical head 24 at its other end which extends slightly within the coupling 19 and seats against a frusto-conical surface formed on the lower end thereof. The head 24 is provided with a shoulder 25 which is engaged by a flange formed on a nut 26 screw threaded upon the coupling 19.

At its upper or leading end the air passage 18 communicates with a horizontal passage 27 extending completely through the upper portion of the handle 17. The passage 27 is interiorly threaded to receive three parts, namely, a plug 28 which closes one end of the passage, a valve casing 29 which closes the other end of the passage, and a central hollow stop 30 which determines the operative position of the valve casing 29 within the passage. The interior of the stop 30 is frusto-conical in shape in order to permit the insertion into the stop of an expanding tool which expands the stop to wedge its exterior threads into the threads in the passage 27 and thus lock the stop in a fixed position. Interposed between the valve casing 29 and stop 30 is a lead washer 31 which prevents the air leaking out between the casing and the stop into the threads between the casing 29 and passage 27. The valve casing 29 is provided with a valve seat 32 and with transverse air passages 33. The valve seat 32 is adapted to receive and seat a suitable air valve 34 having a spindle 35. The valve 34 is normally held upon the seat 32 by a coiled spring 36 interposed between the valve 34 and the plug 28. Near its outer end the spindle 35 passes through suitable packing shown as a gland packing 37, mounted in a cavity 38, formed in the valve casing 29, and held in place therein by a gland or plug 39 threaded into the cavity 38. The motive agent, such as air under pressure, entering through the passages 18 and 27, passes through the air valve 34 when open, and enters a passage 40 which conducts the air to a longitudinal chamber 41 having a passage 42 which opens on the front face 43 of the body portion.

The coating material, such as paint, lacquer, and the like, may be introduced into the body 16 under pressure or gravity, by threading a hose coupling (not shown) to a pipe 44 depending from the body portion. The pipe 44 is provided with a passage 45 which conducts the coating material into a chamber 46 opening upon the face 43 of the body portion. With this construction the air chamber 42 and the paint chamber 46 are always out of communication with each other within the body of the gun.

The forward or discharge end of the chamber 46 is internally threaded to receive a threaded nozzle 47 through which the coating material is discharged from the gun. On its exterior the nozzle 47 is provided with a substantially hexagonal surface 48, a tapered portion 49, and a cylindrical discharge tip or orifice 50.

On its interior the nozzle is provided with a cylindrical passage 51, a frusto-conical passage 52, a second frusto-conical passage 53, a third frusto-conical passage 54, and a cylindrical discharge passage 55 terminating at the orifice 50 as described more in detail in my application Serial No. 56,666, filed September 16, 1925.

The walls of the frusto-conical passages 52, 53 and 54 have an inclination of 60°, 30° and 15° included angle, respectively. Extending longitudinally through the chamber 46 and substantially axially thereof is a needle or spindle 56 having a tip 57 formed on its forward end. The spindle 56 is provided with a frusto-conical surface 58 shaped to engage the wall of the passage 53 and thus act as a valve to control the discharge of coating material.

The spindle 56 passes out of the rear end of the chamber 46 through a plug 59 the open end of which is closed by packing 60 which is held in place by a packing or gland plug 61 threaded into the plug 59. The spindle 56 may be withdrawn from or inserted into the chamber 46 while the packing 60 is in place as the reduced end of the spindle passes through the packing without picking up strands thereof. Outside the chamber 46 the spindle 56 is secured to a guide 62 arranged to move in a longitudinal bore or spring chamber 63 formed in the body 16. The rear end of the spindle 56 is pinned to a stem 64 threaded at its free end to engage threads on an adjusting sleeve 65 rotatably mounted in a plug 66 threaded into the body 16. The spindle 56 is actuated in a direction to maintain the valve passage 53 normally closed by a spring 67, coiled about the stem 64 and the rear end of the spindle 56, interposed between the inside faces of the guide 62 and stem 65.

In order to move the spindle 56 in a direction to open the valve passage against the tension of the spring 67 the central portion of a strap yoke 68 is loosely interposed between an adjusting nut 69, on the sleeve 65, and the plug 66. The free ends of the yoke extend along the opposite sides of the body portion and are connected by pivot pins 70 to the arms 71 of a yoke or lever arm 72 embracing the body 16 and pivoting on a horizontal pin 73 carried by the body 16.

The inner face of the lever arm 72 engages the spindle 35 of the air valve 34. The lever arm 72 thus operates to open both the air and coating material valves when the arm 72 is actuated against the tensions of the springs 36 and 67 which close the valves when the lever arm 72 is released. As sufficient play is provided for the yoke 68 before it engages the nut 69 the air valve will be opened before the coating material valve opens and the air valve will be closed after the coating material valve is closed.

In order to actuate the lever arm 72 its lower end is curved to form a grip 74 for a plurality of the fingers of the hand of the operative grasping the tool handle, which is provided with a conveniently located finger rest and positioning member 75. The tool handle is also provided with a smooth under face 76 which is adapted to seat upon the hand of the operative grasping the handle to assist him in supporting the tool. From an inspection of Fig. 14 it will be apparent that the handle 17 below the finger rest 75 is wider than the portion of the handle above the rest by substantially the width of the grip 74. This construction is provided so that when the grip 74 is drawn towards the handle 17 in actuating the air and coating material valves the combined handle and grip engaged by the index and second finger will have substantially the same width or girth as the portion of the handle engaged by the little and adjacent fingers.

In order to provide a discharge nozzle for the air the front face 43 of the body 16 is provided with a vertical seat 77 of reduced diameter upon which a main air discharge nozzle 78 is seated concentric with the inner nozzle 47. The nozzle 78 has an internal surface spaced from the external surface of the nozzle 47 throughout its length so that air can pass out of the passage 42 and be discharged from the gun.

The spray gun embodying my present invention preferably includes means for supplementally discharging air under pressure upon the discharged mist or cloud of material and main discharged air to effect the flattening, spreading or fan-shaping thereof when desired and accordingly there is formed in the body 16 a supplemental air passage 79 leading from the chamber 42 and terminating at the seat 77. In the rear face of the nozzle 78 is a continuous annular groove constituting, with the adjacent portion of the body, a circular air passage 80, the construction being such that some portion of the latter always lies opposite the forward end of the supplemental air passage 79 irrespective of the angular positions of the nozzle 78 with relation to the axis of the tool body.

The nozzle 78 is adjustably held in place flatwise against the forward end of the tool body by a suitable locking means shown as an internally threaded collar or nut 81 having an inturned flange 82 to engage a circular seat 83 formed in the outer face of the nozzle 78. The outer face of the nozzle 78 is provided with a pair of diametrically opposed jet members 84 and 85 having the inwardly directed air passages 86 and 87 in communication with the air passage 80 through the passages 88 and 89 in any position of angular adjustment of the nozzle 78. The nozzle 78 is assembled with the body merely by placing it flatwise against the seat 77 and screwing on the nozzle lock. When it is desired to adjust the plane of the sprayed material this may be readily effected merely by backing off the nozzle lock slightly, turning the nozzle 78 to bring the supplemental jets 84 and 85 to the desired position or plane, and again tightening the nozzle lock.

The supplemental air discharge is desirably readily controllable and for this purpose I have provided a valve spindle 90 arranged to completely close the supplemental air passage 79. The valve spindle 90 projects from a body portion 91 which is threaded to engage internal threads formed in a boss 92 on the body 16. Surrounding the valve spindle 90 and interposed between the body portion 91 and boss 92 is a packing 93. The body portion is provided with a knurled cap 94 by which the valve spindle 90 may be manipulated to control the volume of supplemental air discharged through the supplemental air passages.

When it is desired to admit coating material not under pressure or gravity to the spray gun the material hose (not shown) is disconnected and a vented closure 95 is threaded on the lower end of the pipe 44. To this end the closure 95 is provided with a central hollow boss 96 threaded interiorly on opposite sides of the closure. The lower end of the pipe 44 is shaped to fit a seat 97 formed on the boss 96 to insure a tight joint. The lower threads on the boss 96 are engaged by outer threads on a pipe 98 extending down towards the bottom of a container 99 which contains the coating material. The container is attached to the closure by the same means disclosed in the application filed by J. J. Preble and me, December 26, 1924, Serial No. 758,055.

The consruction described produces a target substantially oval in formation. In using the gun to coat a surface adjacent another surface of a different material or color it is impossible to obtain a clean line of demarcation between the two surfaces. In order to form a target with one or more straight-edges so that the line or lines of demarcation between adjacent surfaces may be clean I have devised a straight-edge forming attachment which may be readily mounted on the front end of the gun.

Figures 3, 4:
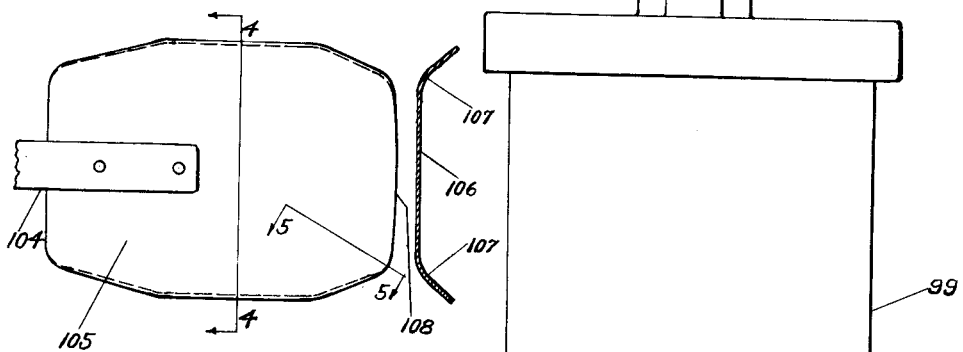
Fig. 3 is a detail in plan showing the back of one of the straight-edge forming plates.
Fig. 4 is a detail in sectional elevation on the line 4—4 of Fig. 3.
Figure 5:
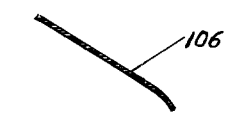
Fig. 5 is a detail in sectional elevation on the line 5—5, Fig. 3.

To this end a ring 100 fits over the cylindrical surface of the nozzle 78. The ring 100 is held in place by a screw 101, one end of which engages the peripheral surface of the nozzle 78 and the other end of which is provided with a knurled head 102 by which the screw may be manipulated to secure or release the ring. The ring 100 is provided with a pair of rigid arms 103 which project beyond the front end of the spray gun on lines diverging from the longitudinal axis thereof. Pivoted to each of the arms 103 is arm 104 to which is secured a straight-edge forming plate 105. As shown in Fig. 4 the plate has a trough formation comprising a flat portion 106 the longitudinal edges of which are turned up to form the wings 107. The leading or work-engaging edge 108 of the flat portion 106 is reduced in width and is slightly convex (Fig. 3) in order to permit the edge 108 to rock laterally on the surface to be coated. As shown in Fig. 5 the portion 106 on the surface of the corners between the wings and the ends of the edge 108 is slightly concaved.

The straight-edge forming plates may be swung separately into and out of the path of the flattened discharge. In order to hold the plates in any position of adjustment a friction washer 109 is interposed between the arms 103 and 104. The proper tension on the friction washer 109 to permit the movement of a straight-edge forming plate and its retention in adjusted position is obtained by a friction pivot device comprising a screw 110 which passes through both of the arms 103 and 104 and the friction washer 109. One end of the screw 110 is provided with the usual slotted head. The other end of the screw is provided with screw-threads which engage a tension adjusting nut 111 and a lock nut 112. Interposed between the head of the screw and the adjacent arm is a spring washer 113. With this construction each arm 104 may be swung on its arm 103 separately to bring one or both of the straight-edge forming plates into or out of the path of the flattened discharge. Each straight-edge forming plate may be also positioned with its work-engaging edge 108 at varying distances from the extended longitudinal axis of the spray gun. This position is maintained during the operation of the spray gun by the friction pivot.

Figure 6:
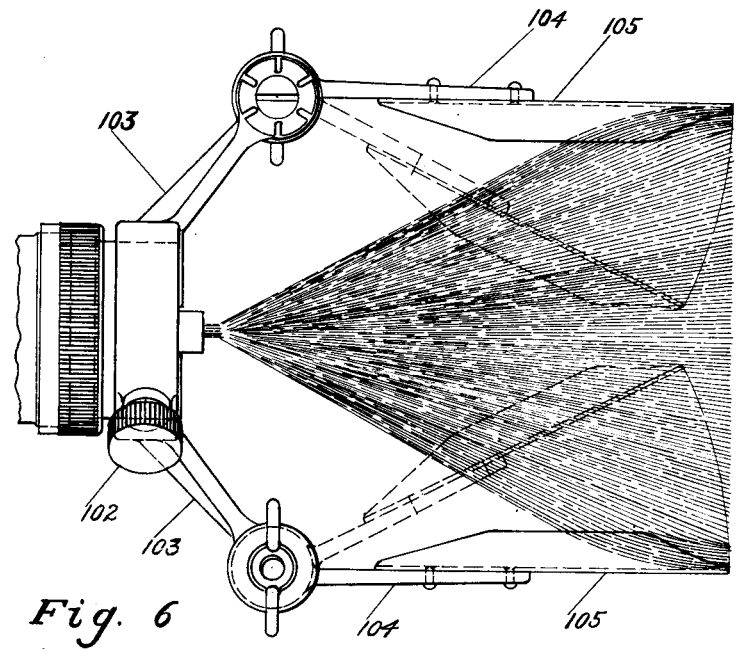
Fig. 6 is a detail in plan showing the relationship between the main discharge, the supplemental jet delivery member, and the straight-edge forming attachment when positioned to truncate the edges of the flattened discharge on lines normal to its major axis.
Figure 7:
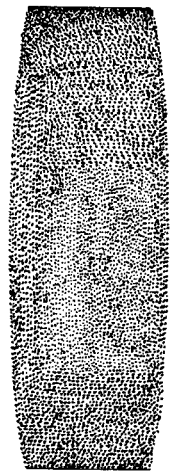
Fig. 7 is a plan of the target formed when the straight-edge forming attachment operates as in Fig. 6.
Figure 8:
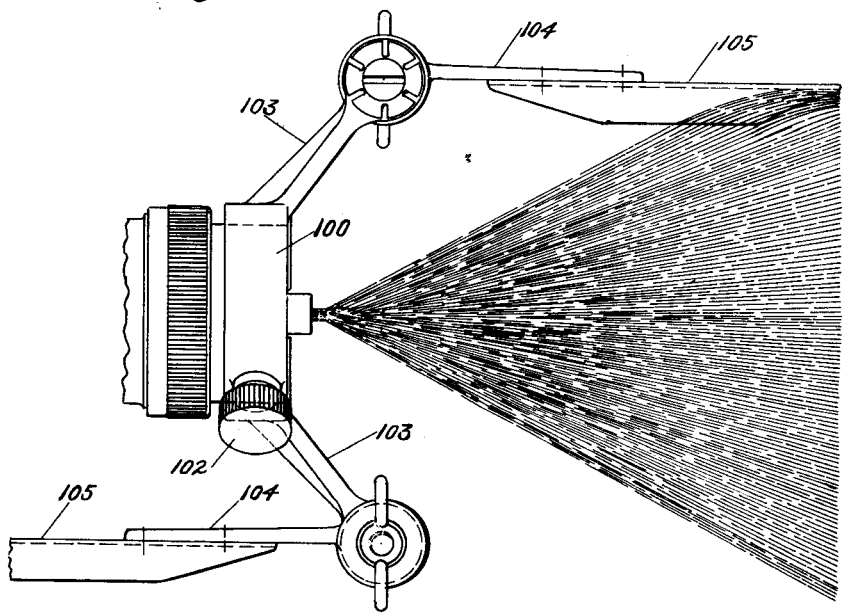
Fig. 8 is a detail in plan showing the arrangement of the straight-edge forming attachment when positioned to truncate one edge of the flattened discharge on a line normal to its major axis.
Figure 9:
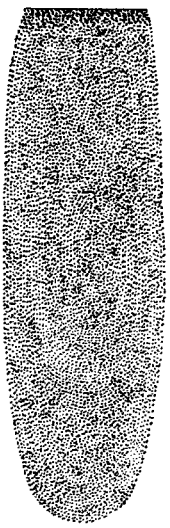
Fig. 9 is a plan of the target formed when the straight-edge forming attachment operates as in Fig. 8.

From an inspection of Fig. 6 it is apparent that the pivotal points for the straight-edge forming plates are located in advance of the gun and at a distance from the longitudinal axis therefor. With this construction the plates are positioned diagonally across the path of the flattened spray which position may be varied so that the extended longitudinal median line of the plates may meet the extended longitudinal axis of the gun at varying distances therefrom. This positioning of the plates diagonally across the path of the flattened discharge prevents excess deposit of coating material on the plates. Two causes contribute to produce this result. In approaching the straight-edge forming plates the flattened discharge meets an air pocket between the edge of the flattened discharge and the plate. This air pocket diverts the edge of the flattened discharge along a curved line into the plane of the straight-edge forming plate. The flattened discharge as it approaches the straight-edge forming plate also induces a current of air to flow between the flattened discharge and the plate. This current of air blows away those particles of coating material which have a tendency to remain on the straight-edge forming plates.

The straight portion 106 of the plates forms the straight-edge. The wings 107 and the little concaved corners between the wings and the ends of the edge 108 divert the edges of the flattened discharge back into the main body thereof and thus prevent the coating material from passing beyond the width of the surface engaging edge 108.

Figure 1:
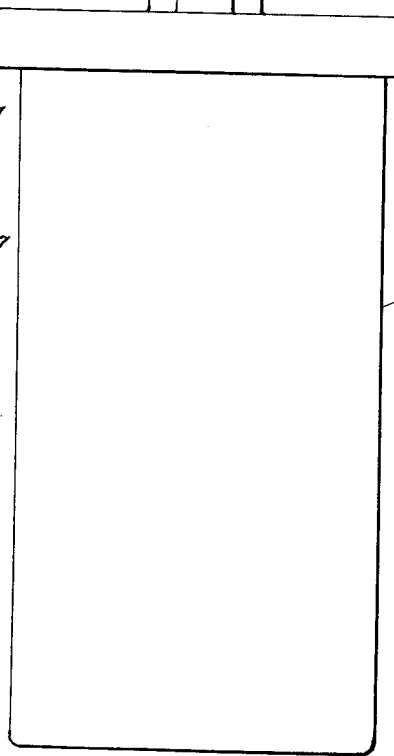
Figure 10:
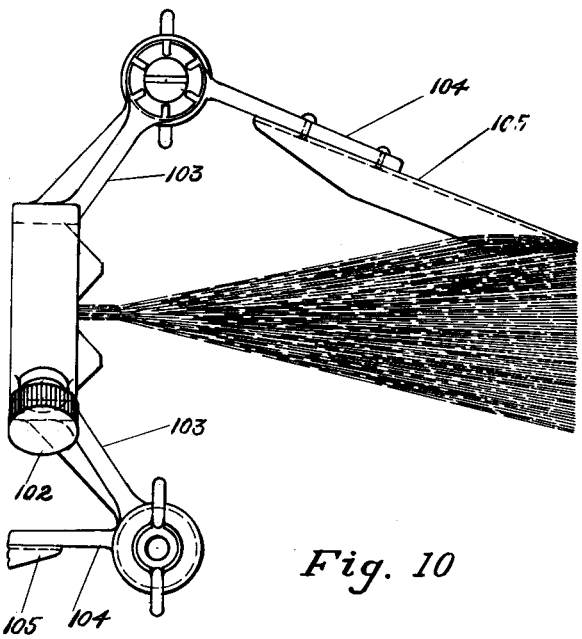
Fig. 10 is a detail in plan showing the straight-edge forming attachment positioned to truncate one face of the flattened discharge on a line parallel to its major axis.
Figure 11:
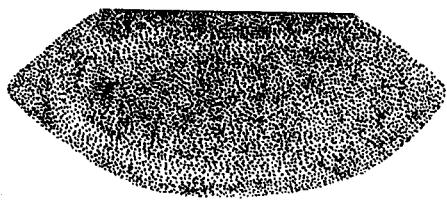
Fig. 11 is a plan of the target formed when the straight-edge forming attachment operates as in Fig. 10.
Figure 12:
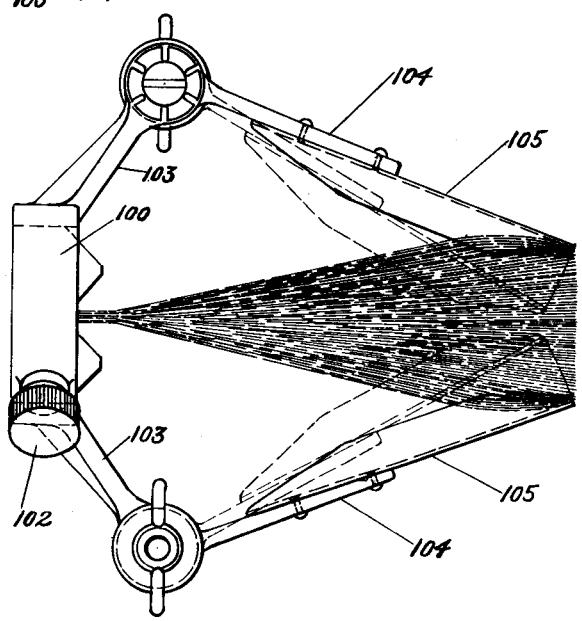
Fig. 12 is a detail in plan showing the straight-edge forming attachment positioned to truncate both faces of the flattened discharge on lines parallel to its major axis.
Figure 13:
Fig. 13 is a plan of the target formed when the straight-edge forming attachment operates as in Fig. 12.

The straight-edge forming attachment by being secured to the nozzle 78 partakes of the adjustment thereof to change the plane of the flattened discharge. The relationship of the straight-edge forming plates with the supplemental jets 84 and 85 is fixed, but the plates may be changed with relation to the jets so that the plates may form a straight edge on a line or lines normal to the major axis of the flattened discharge or on a line or lines parallel with the said major axis. To this end the front face of the ring 100 has a segment 114 having a recess 115 formed therein. The ring 100 may be positioned on the nozzle 78 so that the recess 115 embraces one of the supplemental jet nozzles (Fig. 1) or the ring may be positioned on the nozzle 78 so that the segment 114 rests against the side faces of the supplemental jet delivery nozzles. As shown in Fig. 1 the recess 115 is slightly larger than the embraced supplemental jet delivery nozzle in order to provide a small tolerance in the adjusted position of the gun. Sometimes the supplemental jets form the flattened discharge on a plane slightly out of the expected plane. By providing a small tolerance in the adjusted position of the straight-edge forming attachment both in the position shown in Fig. 1 and that of Fig. 10 the attachment may be shifted slightly to compensate for the error in the plane of the flattened discharge and thus insure the final adjusted position of the straight-edge forming plates in planes either normal to or parallel with the plane of the flattened discharge.

In the first position of the ring 100 the flat portions 106 of the straight-edge forming plates 105 are located in planes normal to the plane of the flattened discharge. In this position the plates truncate one or both edges of the flattened discharge on a line or on lines normal to the major axis thereof (Figs. 6, 7, 8 and 9).

In the second position of the ring 100 the flat portions 106 of the straight-edge forming plates are located in planes parallel with the plane of the flattened discharge. In this position the plates truncate one or both faces of the flattened discharge on a line or on lines parallel with the major axis thereof (Figs. 10, 11, 12 and 13).

Nothing herein explained is to be interpreted as limiting the invention in the scope of its application to use in connection with the particular apparatus or the particular mode of operation or both selected for purposes of illustration and explanation. While the particulars of construction herein set forth are well suited to one mechanical form of the invention, it is not limited to these details of construction, nor to the conjoint use of all its features, nor is it to be understood that these particulars are essential since they may be variously modified within the skill of the artisan without departing from the true scope of the actual invention, characterizing features of which are set forth in the following claims by the intentional use of generic terms and expressions inclusive of various modifications.

What is claimed as new, is:

1. A spray gun having, in combination, a body having means to admit coating material and a motive agent for discharge therefrom, means for supplementally discharging motive agent upon the main discharge to flatten or spread the same, and means for truncating the flattened discharge comprising a pair of rigid diverging arms connected to the second named means, and a straight-edge forming plate connected to each of the arms.

2. A spray gun having, in combination, a body having means to admit coating material and a motive agent for discharge therefrom, means for supplementally discharging motive agent upon the main discharge to flatten or spread the same, and means for truncating the flattened discharge comprising a pair of rigid diverging arms connected to the second named means, and a straight-edge forming plate adjustably connected to each of the arms.

3. A spray gun having, in combination, a body having means to admit coating material and a motive agent for discharge therefrom, means for supplementally discharging motive agent upon the main discharge to flatten or spread the same, and means for truncating the flattened discharge comprising an arm connected to the second named means and a straight-edge forming plate and connections between the arm and the plate permitting it to extend towards the extended longitudinal axis of the gun with different degrees of inclination.

4. A spray gun having, in combination, a body having means to admit coating material and a motive agent for discharge therefrom, means for supplementally discharging motive agent upon the main discharge to flatten or spread the same, and means for truncating the flattened discharge comprising an arm connected to the second named means projecting from the body on a line diverging from the longitudinal axis of the gun, a straight-edge forming plate, and connections between the arm and the plate including a pivot permitting it to be swung to a position converging on the extended axis of the gun.

5. A spray gun having, in combination, a body having means to admit coating material and a motive agent for discharge therefrom, means for supplementally discharging motive agent upon the main discharge to flatten or spread the same including a cylindrical member having a pair of supplemental jet delivery nozzles projecting from one end face, and means for truncating the flattened discharge comprising a ring-like member mounted to engage the periphery of the cylindrical member and provided with a recessed segment arranged to engage at least one of the jet delivery nozzles in one position of adjustment, one of the jet delivery nozzles fitting into said recess in another position of adjustment.

6. A spray gun having, in combination, a body having means to admit coating material and a motive agent for discharge therefrom, means for supplementally discharging motive agent upon the main discharge to flatten or spread the same including a supplemental jet delivery member angularly adjustable to vary the plane of the flattened discharge, and means for truncating the flattened discharge movable with said member.

7. A spray gun having, in combination, a body having means to admit coating material and a motive agent for discharge therefrom, means for supplementally discharging motive agent upon the main discharge to flatten or spread the same including a supplemental jet delivery member, and means for truncating the flattened discharge comprising a ring secured to said member and provided with a pair of rigid arms projecting beyond the body on lines diverging from the longitudinal axis of said body and a straight-edge forming plate pivotally supported from each of said arms.

8. A spray gun having, in combination, a body having means to admit coating material and a motive agent for discharge therefrom, means for supplementally discharging motive agent upon the main discharge to flatten or spread the same, and means for truncating the flattened discharge connected to the second named means comprising a straight-edge forming plate having a substantially flat surface terminating along its longitudinal edges in turned-up wings.

9. A spray gun having, in combination, a body having means to admit coating material and a motive agent for discharge therefrom, means for supplementally discharging motive agent upon the main discharge to flatten or spread the same, and means for truncating the flattened discharge connected to the second named means comprising a straight-edge forming plate having a substantially flat surface terminating along its longitudinal edges in upturned wings, the front or work-engaging edge of the plate being convexed.

10. A spray gun having, in combination, a body having means to admit coating material and a motive agent for discharge therefrom, means for supplementally discharging motive agent upon the main discharge to flatten or spread the same, and means for truncating the flattened discharge connected to the second named means comprising a straight-edge forming plate having a substantially flat surface provided with two longitudinal edges and a leading or work-engaging edge, the longitudinal edges being upturned and the corners of the plate between the wings and the work-engaging edge being concaved.

11. A spray gun having, in combination, a body having means to admit coating material and a motive agent for discharge therefrom, means for supplementally discharging motive agent upon the main discharge to flatten or spread the same, and means for truncating the flattened discharge connected to the second named means comprising a straight-edge forming plate having a substantially flat surface terminating along its longitudinal edges in upturned wings, the front or work-engaging edge of the plate being convexed, the corners of the plate between the wings and the work-engaging edge being concaved.

12. A spray gun having, in combination, a body having means to admit coating material and a motive agent for discharge therefrom including an attached container for the coating material and a coupling for the motive agent, and a supporting foot for the coupling mounted substantially in the same plane as the bottom of the container.

13. A spray gun having, in combination, a body having means to admit coating material and a motive agent for discharge therefrom including an attached container for the coating material and a coupling for the motive agent, and a supporting foot swiveled to the coupling mounted substantially in the same plane as the bottom of the container.

14. A spray gun having, in combination, a body having means to admit coating material and a motive agent for discharge therefrom including an attached container for the coating material and a coupling for the motive agent, a supporting foot for the coupling, a thimble secured at one end to the foot and provided on its other end with a frusto-conical head mounted to extend within and seat on the coupling, and a flanged nut secured to the coupling with the flange on the nut seated under the head of the thimble.

15. A spray gun having, in combination, a body having means to admit coating material and a motive agent for discharge therefrom, means for supplementally discharging motive agent upon the main discharge to flatten or spread the same, and means for truncating the flattened discharge connected to the second named means comprising an arm, a straight-edge forming plate and connections between the arm and the plate including a friction pivot.

16. A straight-edge forming attachment for a spray gun comprising a flat plate having lateral wings and a work-engaging edge.

17. A straight-edge forming attachment for a spray gun comprising a flat plate having lateral wings and a convex work-engaging edge.

18. A straight-edge forming attachment for a spray gun comprising a flat plate having lateral wings and a work-engaging edge, the portion of the plate lying adjacent the corners between the wings and the ends of the work-engaging edge being concaved.

19. A straight-edge forming attachment for a spray gun comprising a flat plate having lateral wings and a convex work-engaging edge, the portion of the plate lying adjacent the corners between the wings and the ends of the work-engaging edge being concaved.

20. In a spray gun, the combination with a body portion having means to supply coating, means to subject the same to the action of a motive agent thereby effecting the discharge of the coating material and a member through which the motive agent may be discharged supplementally upon the discharged coating material to flatten or spread the same, said member being mounted for turning movement upon the body portion to vary the plane of the flattened discharge, of means mounted upon said member for truncating the flattened discharge.

21. In a spray gun, the combination with a body portion having means to supply coating, means to subject the same to the action of a motive agent thereby effecting the discharge of the coating material and a member through which the motive agent may be discharged supplementally upon the discharged coating material to flatten or spread the same, said member being mounted for turning movement upon the body portion to vary the plane of the flattened discharge, of means mounted upon said member, for truncating the flattened discharge, and having a plurality of predeterminedly spaced positions thereon in one of which the flattened discharge is truncated on at least one line substantially normal to the major axis of the flattened discharge and in another one of which the flattened discharge is truncated on at least one line substantially parallel with the major axis of the flattened discharge.

In testimony whereof I have signed my name to this specification.

WAYNE B. THOMPSON.